(12) United States Patent
Hsieh et al.

(10) Patent No.: US 8,142,857 B2
(45) Date of Patent: Mar. 27, 2012

(54) COMPOUND AND METHOD FOR PRODUCING THE SAME

(75) Inventors: Chi-Fa Hsieh, Zhongli (TW); Jui-Ming Yeh, Zhongli (TW); Tai-Kang Liu, Longtan Shiang (TW)

(73) Assignee: Chung-Shan Institute of Science and Technology, Armaments Bureau, Ministry of National Defense, Taoyuan County (TW)

( * ) Notice: Subject to any disclaimer, the term of this patent is extended or adjusted under 35 U.S.C. 154(b) by 637 days.

(21) Appl. No.: 12/330,382

(22) Filed: Dec. 8, 2008

(65) Prior Publication Data

US 2010/0143597 A1 Jun. 10, 2010

(51) Int. Cl.
*B05D 1/34* (2006.01)
(52) U.S. Cl. ........ 427/387; 427/384; 524/591; 524/839; 524/323
(58) Field of Classification Search .................. 427/384, 427/387; 524/591, 839, 323
See application file for complete search history.

(56) References Cited

U.S. PATENT DOCUMENTS

| 4,554,308 | A | * | 11/1985 | Russiello | 524/591 |
| 4,730,021 | A | * | 3/1988 | Zom et al. | 524/457 |
| 5,095,069 | A | * | 3/1992 | Ambrose et al. | 524/591 |
| 6,423,425 | B1 | * | 7/2002 | Faucher et al. | 428/626 |
| 7,261,843 | B2 | * | 8/2007 | Knox et al. | 252/586 |
| 2006/0058453 | A1 | * | 3/2006 | Argyropoulos et al. | 524/589 |
| 2006/0280949 | A1 | * | 12/2006 | Shirakawa et al. | 428/418 |
| 2009/0042060 | A1 | * | 2/2009 | Zawacky et al. | 428/704 |
| 2010/0209697 | A1 | * | 8/2010 | Bowles et al. | 428/323 |

* cited by examiner

*Primary Examiner* — Gregory Delcotto

(57) ABSTRACT

The invention provides a compound and method of producing the same. The method of the invention includes the following steps. First of all, Polycaprolactone (PCL), dimethylol propionic acid (DMPA), 4,4'-methylenebis (cyclohexyl isocyanate) (H12MDI), and dibutyltin dilaurate (DBT) are mixed in a solvent in the first place and a solution is formed. This solution is then mixed with triethylamine (TEA) and triethylene tetramine (TETA). After that, amino-terminated anionic waterborne polyurethane (WPU) is produced. A sol-gel process is proceeded with a mixture of amino-terminated anionic waterborne polyurethane, tetraethylorthosilicate (TEOS) without any extra catalyst, and a compound, waterborne polyurethane-silica nanocomposite materials, is eventually produced.

8 Claims, 6 Drawing Sheets

COMPOUND AND METHOD FOR PRODUCING THE SAME

BACKGROUND OF THE INVENTION

1. Field of the Invention

The present invention relates to a compound and method for producing the same, and more particularly, the compound is the waterborne polyurethane-silica composite material. Additionally, the method of the present invention produces the waterborne polyurethane-silica composite material without any extra catalyst.

2. Description of the Prior Art

Recently, organic-inorganic mixing nanocomposite material is a major topic both in the industry and in the academia. It is because the organic-inorganic nanocomposite material has flexibility, ductility, rigidity, and high thermal stability, so as to broaden the applied scope.

The nanoinorganic of the organic-inorganic nanocomposite material is produced by a sol-gel process of inorganic alkoxide ($M(OR)_n$), for example, $SiO_2$, $TiO_2$, and ZnO. Since 1970, the inorganic alkoxide is proceeded a sol-gel process by an in-situ approach to form nanopraticles in an organic polymer, so as to form organic-inorganic nanocomposite material. A sol-gel process is to add acid or alkaline catalysts into an inorganic alkoxide which is proceeding a hydrolytic reaction to form an inorganic hydroxide ($M(OH)_n$). The chemical equation is as followed:

$$M(OR)_n + nH_2O \rightarrow M(OH)_n + nROH$$

Wherein M=Na, Ba, Cu, Al, Si, Ti, Ge, V, W, etc., and R=$CH_3$, $C_2H_5$, $C_3H_7$, $C_4H_9$. $M(OH)_n$, in particular, comprises a functional group and thus it can proceed a polymerization reaction to form O—M—O—M three-dimensional network.

Additionally, polyurethane has both flexibility and rigidity. It is low in cost, easy to manufacture, and various in design. Thus it is widely applied to coating, building, and electronic sealing. However, polyurethane is low in thermal stability and high in hygroscopicity. On the primes of keeping the features of the polyurethane, introducing inorganic to raise the heat resistance and the water repellency of polyurethane composite material becomes a popular study topic in related scopes.

According to the reference of producing polyurethane composite material, polyurethane is classified into non-waterborne polyurethane and waterborne polyurethane. The methods apply (A) for producing non-waterborne polyurethane composite material classified as (1) directly introducing silicon dioxide particles (e.g. Min-U-Sil, colloidal silica, or fumed silica); and (2) silicon dioxide formed by a sol-gel process with acid catalysts (e.g. hydrochloric acid, acetic acid) or alkaline catalysts (e.g. ammonia). Additionally, the methods apply (B) for producing waterborne polyurethane composite material classified as (1) directly introducing silicon dioxide particles (e.g. fumed silica); and (2) silicon dioxide formed by a sol-gel process with acid catalysts (e.g. hydrochloric acid). Moreover, we cannot find any disclosure about sol-gel process with basic catalysts. As mentioned above, if the method of directly introducing silicon dioxide particles is not adopted, the polyurethane composite material is produced with catalysts only.

SUMMARY OF THE INVENTION

Accordingly, an aspect of the present invention is to provide a method for producing a compound. The compound is a polyurethane composite material and the method of the present invention produces the compound without any extra catalysts.

According to an embodiment of the invention, the method comprises the following steps:

First of all, polycaprolactone (PCL), dimethylol propionic acid (DMPA), 4,4'-methylenebis (cyclohexyl isocyanate) (H12MDI), and dibutyltin dilaurate (DBT) are mixed in a solvent to form the first solution. Subsequently, the first solution is mixed with a triethylamine (TEA) solution to form a second solution and the second solution is mixed with deionized water to form a second aqueous solution. The second aqueous solution is mixed with triethylene tetramine (TETA) solution to form a third solution and he third solution is filtered in a pressure-reducing environment to obtain a waterborne polyurethane (WPU) solution. Particularly, the terminal of the waterborne polyurethane comprises an amino group.

Furthermore, the waterborne polyurethane solution is mixed with tetraethylorthosilicate (TEOS) to form a fourth solution. Finally, part of the fourth solution is coated on a carrier and the solution on the carrier is heated, so as to produce the compound with thin film type.

Another aspect of the present invention is to provide a compound which is polyurethane composite material produced without any extra catalyst.

According to one embodiment of the invention, the compound comprises waterborne polyurethane and silicon dioxide. The terminal of the waterborne polyurethane comprises an amino group which is primary amine or other proper amino group. Silicon dioxide is mixed with the waterborne polyurethane.

The objective of the present invention will no doubt become obvious to those of ordinary skills in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
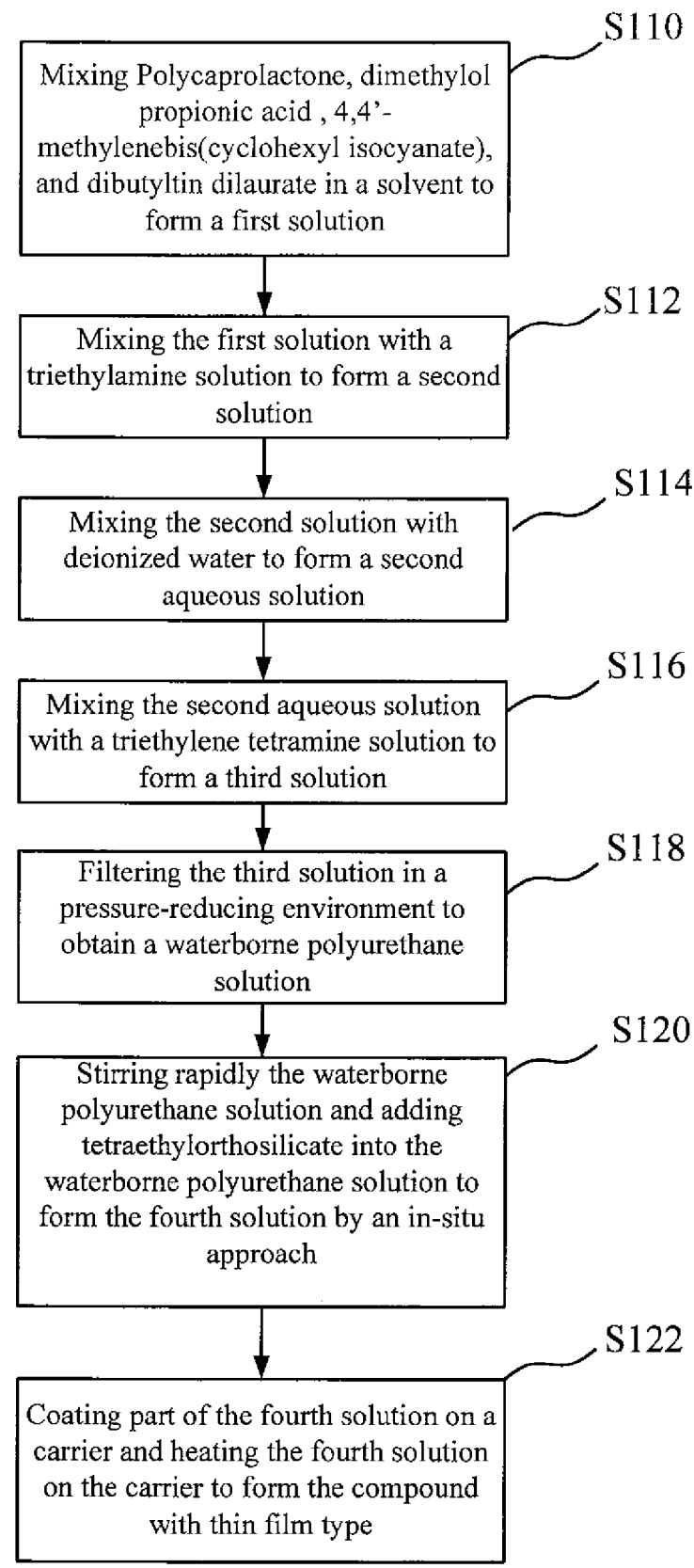
FIG. 1 illustrates a producing flow chart according to one embodiment of the present invention.
Figure 2:
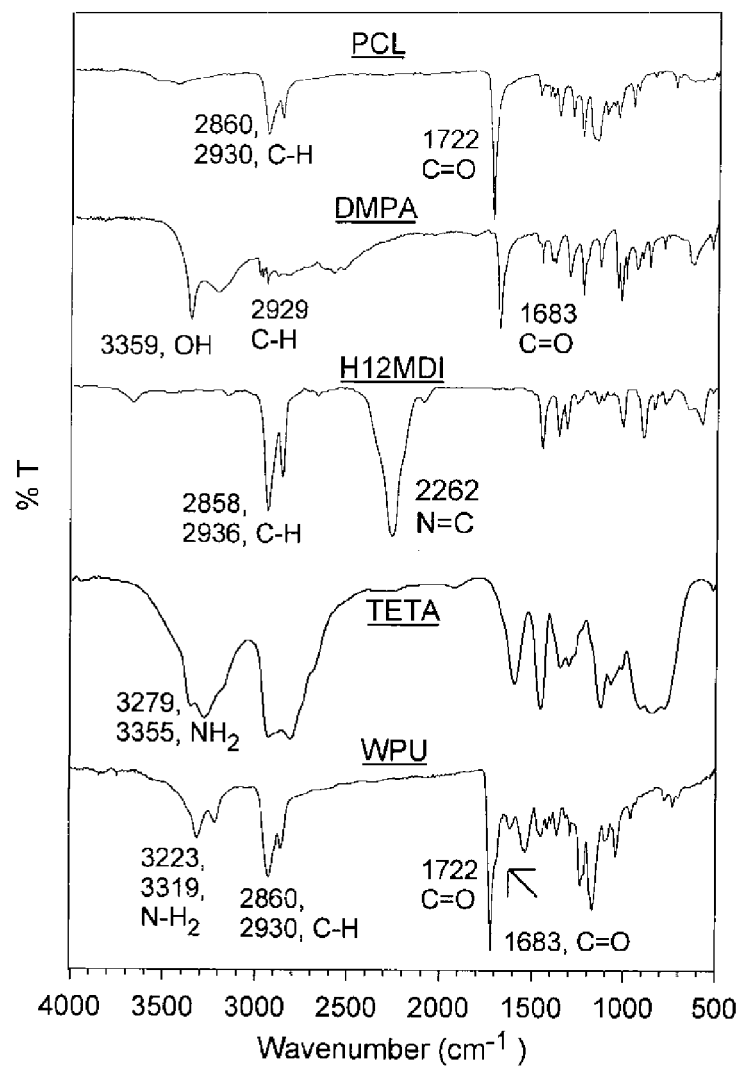
FIG. 2 illustrates FTIR spectrums of PCL, DMPA, H12MDI, TETA and WPU according to the present invention.

The present invention is to provide a compound and method for producing the same. The compound is a polyurethane composite material and the method for producing the compound without any extra catalyst. Embodiments of the present invention are disclosed as followed:

Please refer to FIG. 1. FIG. 1 illustrates a flow chart according to one embodiment of the present invention.

As shown in FIG. 1, in one embodiment, the method comprises the following steps:

In step S110, PCL, DMPA, H12MDI, and DBT are mixed in a solvent to form the first solution. Subsequently, in step S112, the first solution is mixed with a TEA solution to form a second solution. In step S114, the second solution is mixed with deionized water to form a second aqueous solution. In step S116, the second aqueous solution is mixed with TETA solution to form a third solution. In step S118, the third solution is filtered in a pressure-reducing environment to obtain a waterborne polyurethane solution. The terminal of the waterborne polyurethane comprises an amino group. In step S120, the waterborne polyurethane solution is stirred rapidly and TEOS is added into the waterborne polyurethane solution simultaneously by an simultaneously by an in-situ approach to form the fourth solution. What is remarkable is the addition of TEOS brings a sol-gel process, so as to produce the compound of the present invention in the fourth solution. Finally, in step S122, part of the fourth solution is coated on a carrier and the solution on the carrier is heated, so as to form the compound with thin film type.

The following detailed description describes the environment of the present method. What should be marked is the following procedures, materials, parameters and data are examples of the present invention, but not limited to it.

First of all, a 500 ml PCL is set in a five-necked flask equipped with a proper temperature control apparatus and a pressure-reducing apparatus. PCL with magnetic stirring is degassed in a pressure-reducing environment at 110° C. for 30 minutes and cools down to room temperature (30° C.) under pressure-reducing station. H12MDI, DMPA, DBT, and some solvent are mixed to form a first solution which is proceeded a polymerization reaction at 60° C. for four hours. In practical application, the composition of the solvent can be acetone.

After the first solution cools down to room temperature, the first solution and TEA solution are mixed to form a second solution wherein the TEA solution is formed by TEA mixed with the first solvent and the composition of the first solvent is substantially the same as the solvent. The second solution is stirred at 30° C. for one hour and the second solution is mixed with deionized water to form a second aqueous water. The second aqueous water is mixed with TETA solution to form a third solution wherein the TETA is mixed with the second solvent to form the TETA solution and the composition of the second solvent is substantially the same as the solvent. The third solution is stirred at 60° C. for one hour. After the third solution cools down to room temperature, the third solution is filtered in a pressure-reducing environment to get a waterborne polyurethane solution. The waterborne polyurethane is determined by a moisture titrator and the waterborne polyurethane occupies 26.5 wt %.

In one embodiment, the terminal of the waterborne polyurethane comprises an amino group. In practical application, the amino group can be prime amine or other proper amino group. Additionally, the weight ratio of PCL:DMPA:H12MDI:TEA: TETA is 94.3:31.3:5.9:4.5:4.2, but not limited to this.

Additionally, the characteristic peak of PCL, DMPA, H12MDI, TETA and waterborne polyurethane (WPU) are determined by FTIR. The determining result is as follows.

The C=O characteristic peak of PCL exists at 1722 cm$^{-1}$; the C—O and O—H characteristic peak of DMPA exists at 1683 cm$^{-1}$ and 3359 cm$^{-1}$ respectively; and the N=C characteristic peak of H12MDI exists at 2262 cm$^{-1}$. After polymerization reaction to form WPU, the N=C (2262 cm$^{-1}$) and O—H characteristic peaks (3359 cm$^{-1}$) disappear. The primary amine —NH$_2$ exists at 3223 cm$^{-1}$ and 3319 cm$^{-1}$ that can prove the production is amino-terminated anionic waterborne polyurethane.

Furthermore, the WPU solution with TEOS is proceeded as a sol-gel process. First, pour some WPU solution into a beaker and stir the WPU solution rapidly. TEOS is added into the WPU solution simultaneously by an in-situ approach to form the fourth solution. The fourth solution is stirred at room temperature for one hour to proceed as a sol-gel process to obtain a composite solution. Part of composite solution is coated on a carrier and the carrier is set in a temperature-controllable non-convection baking oven. The temperature raising process is shown in table 1. A compound with thin film type on the carrier is obtained. As shown in table 1, the compound with thin film type is formed at 55° C., 75° C., 100° C., and 120° C.

TABLE 1

| Process | Temperature | Time |
| --- | --- | --- |
| Temperature raised | Room temp.~55° C. | 16 hrs |
| Holding temperature | 55° C. | 5 hrs |
| Temperature raised | 55° C.~75° C. | 10 hrs |
| Holding temperature | 75° C. | 3 hrs |
| Temperature raised | 75° C.~100° C. | 5 hrs |
| Holding temperature | 100° C. | 3 hrs |
| Temperature raised | 100° C.~120° C. | 5 hrs |
| Holding temperature | 120° C. | 3 hrs |

In one embodiment, the compound produced by the method mentioned comprising waterborne polyurethane and silicon dioxide mixed with the waterborne polyurethane wherein the terminal of the waterborne polyurethane comprises an amino group which can be primary amine or other proper amino group.

Waterborne polyurethane-silica nanocomposite material formed by an in-situ approach raises the heat resistance and the water repellency of polyurethane. The rigidity, heat resistance, and the water repellency are rising with the using weight of TEOS.

In practical application, the content of silicon dioxide may change the characters of the compound of the present invention. Table 2 lists four compounds of the invention and weight of TEOS used. Sample a (SWPU) is waterborne polyurethane without silicon dioxide; Sample b (SWPU5) is a waterborne polyurethane-silica nanocomposite material with 5 wt % silicon dioxide (formed by adding 2.42 g TEOS); Sample c (SWPU10) is a waterborne polyurethane-silica nanocomposite material with 10 wt % silicon dioxide (fonned by adding 5.10 g TEOS); and Sample d (SWPU15) is a waterborne polyurethane-silica nanocomposite material with 15 wt % silicon dioxide (formed by adding 8.15 g TEOS).

TABLE 2

| Sample | Weight of WPU Used | Weight of TEOS Used |
|---|---|---|
| a (SWPU) | 50 g | 0 g |
| b (SWPU5) | 50 g | 2.42 g |
| c (SWPU10) | 50 g | 5.10 g |
| d (SWPU15) | 50 g | 8.15 g |

In the following, different samples by (1) contact angle, (2) mechanical property, and (3) thermal property will be analyzed.

Figure 3:
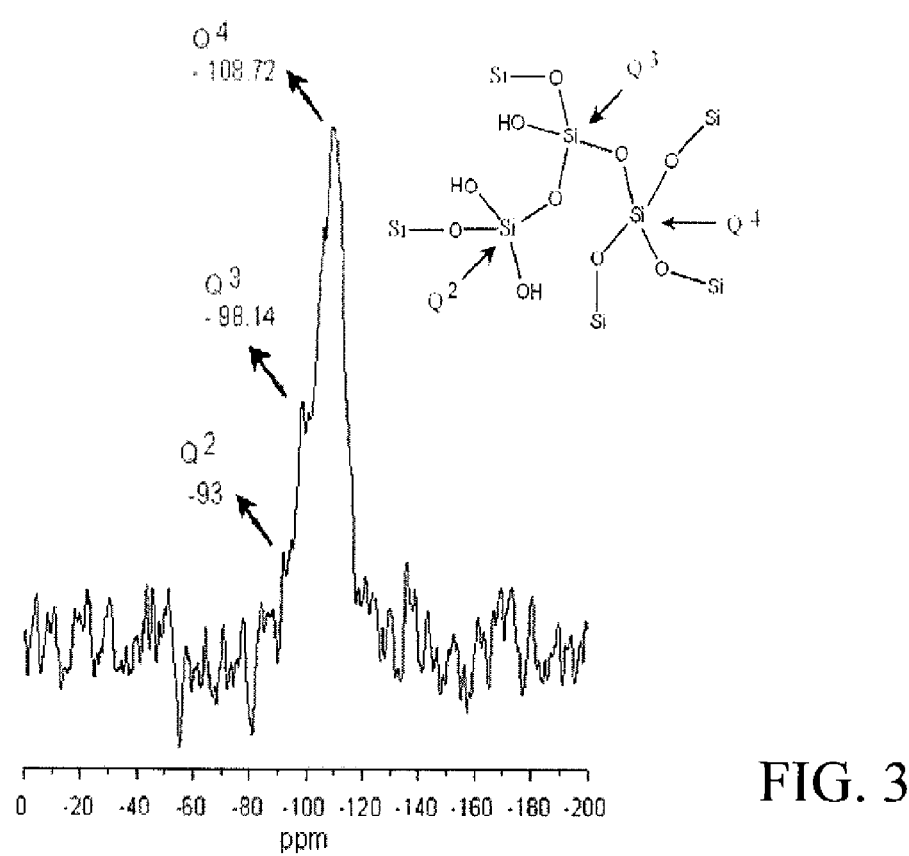
FIG. 3 illustrates 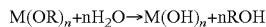Si NMR spectrum of waterborne polyurethane-silica nanocomposite material according to the present invention.

First, sample d (SWPU15) is determined by $^{29}$Si NMR to obtain a silicon spectrum as shown in FIG. 3. FIG. 3 illustrates the character peaks of silicon chemical shift at −108.72 ppm, −98.14 ppm, and −93 ppm. The three character peaks correspond to $Q^4$, $Q^3$, and $Q^2$ constructions respectively. $Q^4$, $Q^3$, and $Q^2$ constructions are shown in the top right-hand corner of FIG. 3. The character peak of $Q^4$ is clear that can prove the TEOS is proceeded as a sol-gel process to produce silicon dioxide.

(1) Contact Angle Testing

Figure 4:
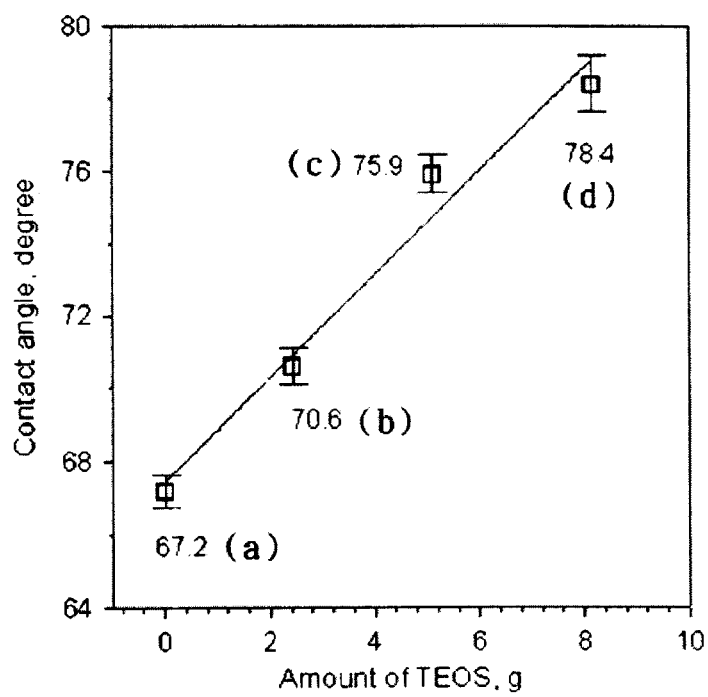
FIG. 4 illustrates contact angle testing result of waterborne polyurethane-silica nanocomposite material according to the present invention.

FIG. 4 illustrates the data of contact angles on the sample surface determined by a contact angle meter. As shown in FIG. 4, the contact angle of sample a (SWPU), without TEOS, is 67.2°. Samples with TEOS, for example, sample b (SWPU5, 5 wt % of silicon dioxide), the contact angle (70.6°) raises 5%, compared with sample a, WPU with silicon dioxide can raise the degree of contact angle. Raising the using weight of TEOS of waterborne polyurethane, for example, sample c (SWPU10, 10 wt % of silicon dioxide), the determined contact angle compared with sample a raises 13% and sample d (SWPU15, 15 wt % of silicon dioxide), the determined contact angle (78.4°) compared with sample a raises 17%. As shown in FIG. 4, the contact angle of waterborne polyurethane composite material raises with the using weight of the TEOS (it can produce silicon dioxide).

(2) Mechanical Property

Figure 5:
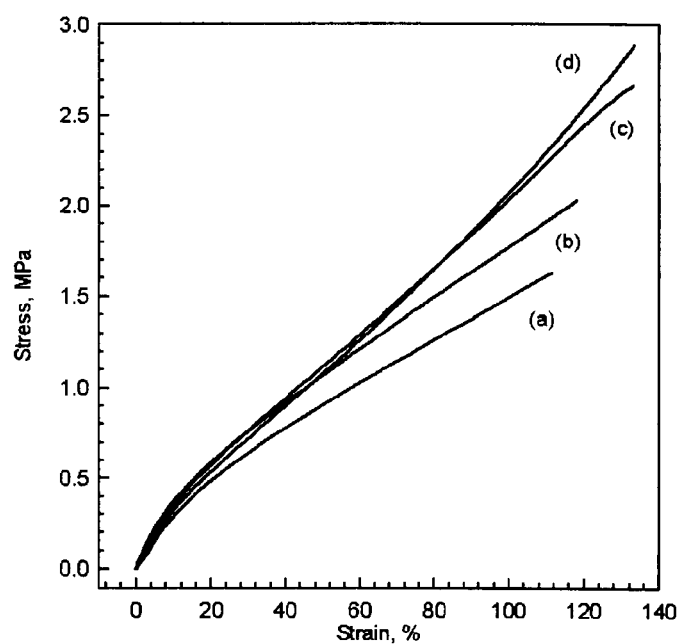
FIG. 5 illustrates the tension intensity of waterborne polyurethane-silica nanocomposite material according to the present invention.

Determining the mechanical property by DMA, the strain speed is set 1 N/min and the thickness of the sample is 150 μm. Determine the stress and strain of the samples at room temperature. FIG. 5 illustrates the testing result of mechanical property of samples with different content of silicon dioxide. Sample a (SWPU, waterborne polyurethane without silicon dioxide), sample b (SWPU5, waterborne polyurethane-silica composite material with 5 wt % silicon dioxide), sample c (SWPU10, waterborne polyurethane-silica composite material with 10 wt % silicon dioxide), and sample d (SWPU15, waterborne polyurethane-silica composite material with 15 wt % silicon dioxide) are represented as (a), (b), (c), and (d) respectively in FIG. 5. As shown in FIG. 5, take a sample, the magnitude of strain is 100% and the magnitude of stress is 1.5 MPa. A waterborne polyurethane base material with little TEOS, for example, sample b (SWPU5), the magnitude of strain is 100% and the magnitude of stress is 1.75 MPa compared with sample a, the magnitude of stress raised by 19%. With the same magnitude of stress, the magnitude of strain is 2.05 MPa for sample c (SWPU10); and the magnitude of strain is 2.10 MP for sample d (SWPU15) compared with the sample a, the magnitude of stress raising 35%. The mechanical intensity rises with the weight of TEOS used.

(3) Thermal Property

Figure 6:
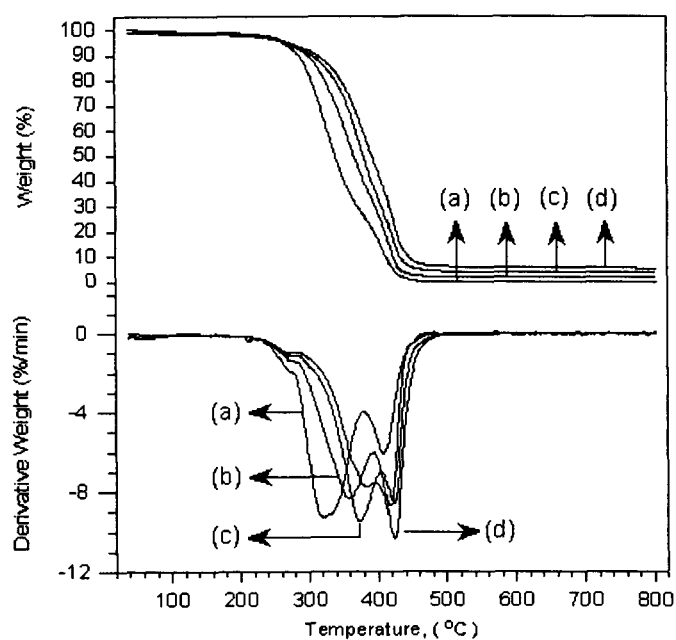
FIG. 6 illustrates thermogravimetric analysis of waterborne polyurethane-silica nanocomposite material according to the present invention.

The thermal stability of sample a, b, c and d are tested by TGA at temperature 40~800° C. The speed of raising temperature is 10° C./min and $N_2$ gas is flown during testing. The result is shown in FIG. 6. (a), (b), (c), and (d) represent sample a (SWPU), sample b (SWPU5), sample c (SWPU10), and sample d (SWPU15), respectively. The upper half of FIG. 6 illustrates the relationship between thermal weight losing and temperature, and the lower half of FIG. 6 illustrates the relationship between first order differentiation of thermal weight losing and temperature. Table 3 lists the date of thermal dissolution temperature. From the curve of first order differentiation, every sample has three dissolution stages. The first dissolution temperature is approximately 40~300° C. wherein thermal weight decreases lightly and the dissolution temperature rises with the content of silicon dioxide. In the stage, thermal weight changes 6~9 wt % and it may be due to the remainder water or molecules decomposing and the polymer which is aqueous dispersion polymer. The aqueous dispersion polymer waterborne polyurethane comprises 26.5 wt % waterborne polyurethane. After the TEOS is added to the solution, the content of compound is increased and the content of solvent is decreased. As shown in table 3, the thermal remainder weight is bigger than waterborne polyurethane without silicon dioxide. The temperature of the second dissolution stage is approximately 400~500° C. The soft chain of waterborne polyurethane-silica decomposes mainly.

The relationship between thermal remainder weight and temperature shows the compound with TEOS with higher thermal resistance than waterborne polyurethane without silicon dioxide.

TABLE 3

| | Thermal remainder weight and temperature | | | | | | |
|---|---|---|---|---|---|---|---|
| | First dissolution stage, 40~300° C. | | Second dissolution stage, 300~400° C. | | | Third dissolution stage, 400~500° C. | |
| | Thermal remainder weight[a] | $T_{max}$[b], | Thermal remainder weight[a] | $T_{max}$[b], | | Thermal remainder weight[a] | |
| Sample | wt % | ° C. | ° C. | wt % | ° C. | ° C. | wt % | ° C. |
| Sample a (SWPU) | 91.5 | 282 | 321 | 26.3 | 380 | 409 | 0.2 | 465 |
| Sample b (SWPU5) | 92.8 | 286 | 359 | 32.5 | 393 | 418 | 2.0 | 492 |
| Sample c (SWPU10) | 93.9 | 288 | 374 | 32.0 | 404 | 423 | 4.2 | 494 |
| Sample d (SWPU15) | 93.2 | 290 | 383 | 47.8 | 396 | 424 | 6.1 | 494 |

[a]thermal remainder weight at the temperature
[b]temperature of the maximum dissolution speed ($T_{max}$)

To sum up, the present invention is to provide a method for producing a compound. The compound is a polyurethane composite material and the method of the present invention produces the compound without any extra catalyst. Polyurethane has the advantages of both being organic and inorganic. It is flexible, ductile, rigid, and high in thermal stability, so as to widen the applied scopes.

Although the present invention has been illustrated and described with reference to the preferred embodiment thereof, it should be understood that it is in no way limited to the details of such an embodiment, but is capable of numerous modifications within the scope of the appended claims.

What is claimed is:

1. A method for producing a compound comprising the following steps:
    mixing polycaprolactone, dimethylol propionic acid, 4,4'-methylenebis (cyclohexyl isocyanate) and dibutyltin dilaurate with a weight ratio in a solvent to form a first solution;
    mixing the first solution with a triethylamine solution to form a second solution;
    mixing the second solution with deionized water to form a second aqueous solution;
    mixing the second aqueous solution with a triethylene tetramine solution to form a third solution;
    filtering the third solution in a pressure-reducing environment to obtain a waterborne polyurethane solution, and the terminal of the waterborne polyurethane comprising an amino group; and
    mixing the waterborne polyurethane solution with tetraethylorthosilicate to form a fourth solution;
    which contains the compound.

2. The method of claim 1, wherein the weight ratio of polycaprolactone:dimethylol propionic acid: 4,4'-methylenebis (cyclohexyl isocyanate):triethylamine:triethylene tetramine is 94.3:31.3:5.9:4.5:4.2.

3. The method of claim 1, wherein the solvent is acetone.

4. The method of claim 3, wherein the triethylamine solution is formed by mixing triethylamine with a first solvent, and the first solvent is acetone.

5. The method of claim 3, wherein the triethylene tetramine solution is formed by mixing triethylene tetramine with a second solvent, and the second solvent is acetone.

6. The method of claim 1, wherein the compound is formed at 55.degree. C., 75.degree. C., 100.degree. C. and 120.degree. C.

7. The method of claim 1, wherein the amino group at a terminal of the waterborne polyurethane is primary amine.

8. The method of claim 1, further comprising the following steps: stirring rapidly the waterborne polyurethane solution; and adding tetraethylorthosilicate into the waterborne polyurethane solution to form the fourth solution in-situ, wherein the addition of tetraethylorthosilicate induces a sol-gel process to produce the compound in the fourth solution.

* * * * *